United States Patent
Weissert et al.

(10) Patent No.: US 10,670,070 B2
(45) Date of Patent: Jun. 2, 2020

(54) DRIVE SHAFT IN A HANDHELD WORK APPARATUS

(71) Applicant: Andreas Stihl AG & Co. KG, Waiblingen (DE)

(72) Inventors: Wolfgang Weissert, Winnenden (DE); Jan Foehrenbach, Fellbach (DE); Andreas Wolf, Leutenbach (DE); Christian Bareiss, Alfdorf-Pfahlbronn (DE); Andreas Rieger, Kaisersbach-Ebni (DE); Simone Pelludat, Schorndorf (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 309 days.

(21) Appl. No.: 15/795,080

(22) Filed: Oct. 26, 2017

(65) Prior Publication Data
US 2018/0119726 A1    May 3, 2018

(30) Foreign Application Priority Data
Oct. 31, 2016    (EP) .................................. 16400047

(51) Int. Cl.
*F16C 3/03*    (2006.01)
*F16C 1/26*    (2006.01)
(Continued)

(52) U.S. Cl.
CPC .............. *F16C 3/03* (2013.01); *A01D 34/905* (2013.01); *F16C 1/06* (2013.01); *F16C 1/08* (2013.01);
(Continued)

(58) Field of Classification Search
CPC . A01D 35/905; F16C 3/03; F16C 1/06; F16C 1/262; F16C 3/06; F16C 1/08;
(Continued)

(56) References Cited

U.S. PATENT DOCUMENTS 2,918,808 A  * 12/1959 Botti ......................... F16C 1/08
                                                                464/53
3,443,451 A    5/1969 Zieber, Jr.
(Continued)

FOREIGN PATENT DOCUMENTS

DE             559971   *  9/1932  ...................... 464/52
DE          3544953 A1     6/1987
(Continued)

*Primary Examiner* — Greg Binda
(74) *Attorney, Agent, or Firm* — Walter Ottesen, P.A.

(57) ABSTRACT

A telescopic drive shaft in a protective tube of a handheld work apparatus has one end connected to a rotational drive and the other end thereof to a driven tool. The drive shaft includes a rigid shaft segment and a connecting section. The rigid shaft segment has a hollow shaft end portion and an engagement length (E) of the connecting section engages therein. The engagement length (E) and the length of the hollow shaft end portion mutually overlap to form a joining section. The hollow shaft end portion is deformed for connecting the connecting section to the rigid shaft segment. The material of the hollow shaft end portion is compressed over its entire periphery and deformed so that the material of the hollow shaft end portion is radially displaced and is pressed in a rotative manner onto the engagement length (E) to produce a balanced, loadable connection.

14 Claims, 11 Drawing Sheets

(51) Int. Cl.
  *F16C 1/06*   (2006.01)
  *A01D 34/90*  (2006.01)
  *F16C 1/08*   (2006.01)
  *F16L 3/06*   (2006.01)
  *F16C 1/28*   (2006.01)

(52) U.S. Cl.
  CPC ............... F16C 1/262 (2013.01); F16L 3/06 (2013.01); *F16C 1/28* (2013.01); *F16C 2310/00* (2013.01); *F16C 2322/50* (2013.01); *Y10T 16/473* (2015.01); *Y10T 74/2045* (2015.01); *Y10T 403/49* (2015.01)

(58) Field of Classification Search
  CPC .... F16C 1/28; F16C 2310/00; F16C 2322/50; F16C 3/035; F16C 1/02; Y10T 16/473; Y10T 74/2045; Y10T 403/49
  USPC .................... 464/52, 53, 162, 182; 403/274; 74/502.4; 16/429
  See application file for complete search history.

(56) References Cited

U.S. PATENT DOCUMENTS

| | | | | |
|---|---|---|---|---|
| 4,238,540 A | * | 12/1980 | Yates | ................. F16C 3/026 |
| 4,654,971 A | * | 4/1987 | Fettes | ................. A01G 3/08 |
| 6,880,248 B2 | * | 4/2005 | Weissert | ............... A01D 34/90 |
| 2007/0144302 A1 | | 6/2007 | Graham | |

FOREIGN PATENT DOCUMENTS

| | | |
|---|---|---|
| DE | 102012208128 A1 | 11/2013 |
| FR | 800661 A | 7/1936 |

\* cited by examiner

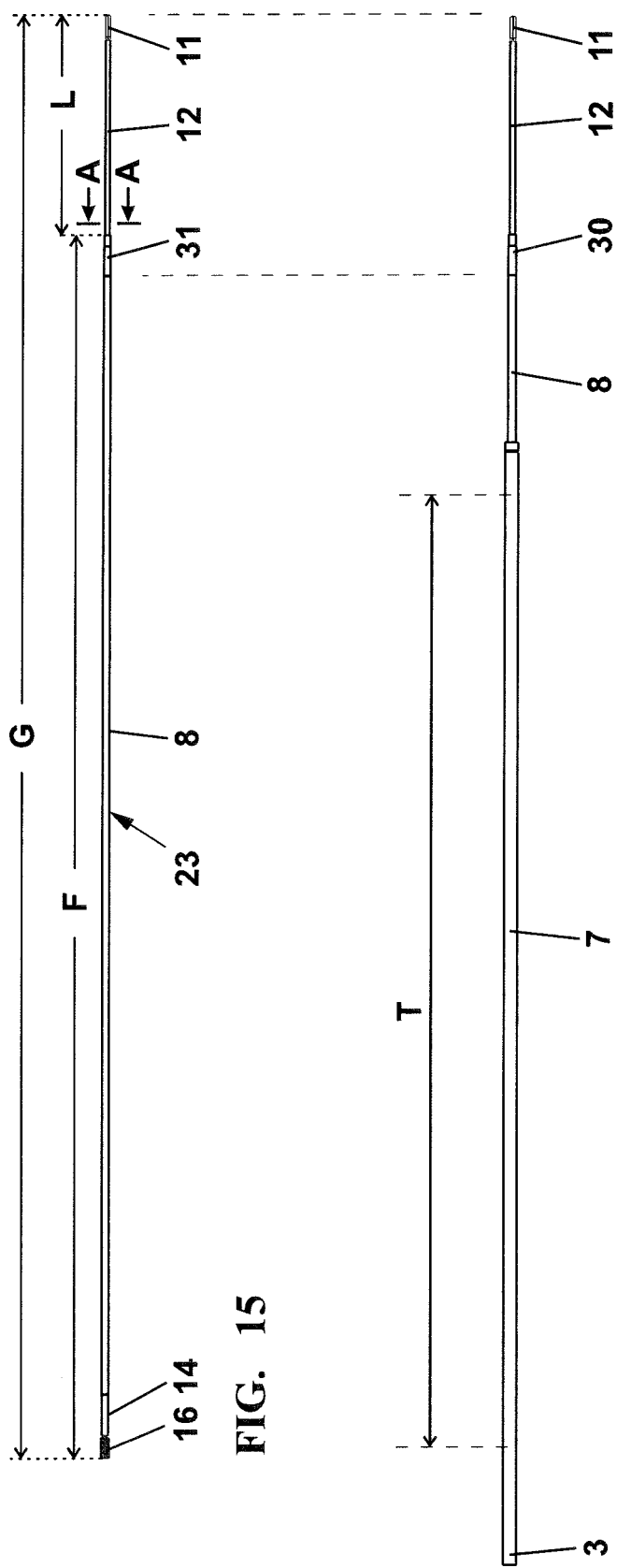
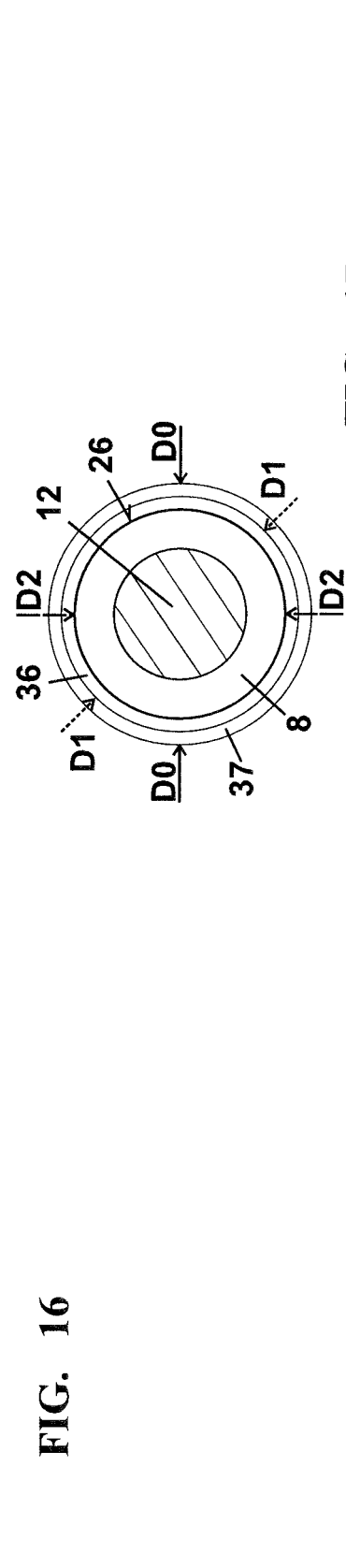
FIG. 15
FIG. 16
FIG. 17

DRIVE SHAFT IN A HANDHELD WORK APPARATUS

CROSS REFERENCE TO RELATED APPLICATION

This application claims priority of European patent application no. 16400047.3, filed Oct. 31, 2016, the entire content of which is incorporated herein by reference.

FIELD OF THE INVENTION

The invention relates to a drive shaft in a protective tube of a handheld work apparatus such as a pruner, a brushcutter or similar work apparatus, wherein drivingly connected on one end of the drive shaft is a rotational drive and on the other end of the drive shaft a tool. The drive shaft comprises at least one rigid shaft section and at least one connecting section for transmitting a torque, wherein the rigid shaft section of the drive shaft is realized with at least one hollow shaft end and an engagement length of the connecting section engages in the hollow shaft end of the rigid shaft section. The engagement length of the connecting section and the length of the hollow shaft end overlap one another and form a connecting section, wherein the hollow shaft end is deformed to connect the connecting section to the rigid shaft section.

BACKGROUND OF THE INVENTION

A known pruner comprises a telescopic drive shaft, a flexible shaft section being provided for vibration damping between the rotational drive and the end of the drive shaft with the tool. The flexible shaft section is installed between the rotational drive and the rigid shaft section. In practice, in spite of using a flexible shaft section, vibrations of the drive occur culminating in tapping drive shafts which, in dependence on the extension length of the telescopic drive shaft, occur in a stronger or weaker manner.

SUMMARY OF THE INVENTION

An object of the invention is to provide a telescopic drive shaft for use in a protective tube of a handheld work apparatus in such a manner that, irrespective of the extension length of the drive shaft, vibrations are reduced and tapping of the drive shaft is avoided.

The object is achieved in that the material of the hollow shaft end is compressed over its entire periphery and is deformed in such a manner that the material of the hollow shaft end is displaced radially and is pressed onto the engagement length of the connecting section in a rotationally connecting manner.

Drivingly connected on one end of the drive shaft is the rotational drive and on the other end of the drive shaft the tool. In this case, the tool can be driven directly by the drive shaft or indirectly by the drive shaft, for example by means of an angle drive or by means of a gear unit. The drive shaft, which consists of at least one rigid shaft section, is connected to connecting sections on its ends in order to transmit the torque, which is applied to the drive shaft, to drive elements. In this case, the rigid shaft section is realized with at least one hollow shaft end. An engagement length of a connecting section engages in the hollow shaft end of the rigid shaft section. The engagement length of the connecting section and the length of the hollow shaft end overlap one another, the hollow shaft end being deformed over a connecting section in order to connect the connecting section to the rigid shaft section in a torque-transmitting manner. The material of the hollow shaft end is compressed over its, in particular, entire periphery and is deformed in such a manner that the material of the hollow shaft end is preferably displaced radially and is pressed onto the engaging end section of the connecting section in a rotationally connecting manner. The hollow shaft end is deformed on the periphery over its entire axial length over the length of the connecting section. The connecting section extends in the axial direction at least over a part length of the engagement length.

As the material of the hollow shaft end is compressed and deformed over its entire periphery, imbalances can be avoided. As a result, vibration excitation of the drive shaft in operation is reduced and low-vibration running of the drive shaft, in particular of a telescopic drive shaft is ensured independently of the extension length thereof.

The material of the hollow shaft end is deformed in a circular manner over a periphery of 360° whilst reducing the outer diameter. A largely rotationally-symmetrical bond, the vibration excitation of which is significantly reduced, is able to be created as a result of the type of deformation over the entire periphery of the hollow shaft section.

The hollow shaft end is deformed over an axial length which is greater than the engagement length of the connecting element for connecting the hollow shaft end to the connecting section. The hollow shaft end is also deformed in sections in which there are no more connecting sections in the interior. The hollow shaft end is deformed over an axial length, in particular over a contiguous axial length, of between 30 mm and 100 mm. In a preferred manner, the deformed section of the hollow shaft end is between 40 mm and 70 mm.

In a simple configuration of the invention, at least the engagement length of the connecting section comprises a peripheral surface with depressions, wherein the material of the hollow shaft end is displaced by deformation so as to engage in the depressions of the connecting section. A positive locking connection is produced in the peripheral direction as a result.

In a preferred further embodiment of the invention, the connecting section includes a first part section with a first degree of deformation and a second part section with a second degree of deformation. In this case, it is provided that the first and the second degrees of deformation vary in size; in particular, the first degree of deformation is smaller than the second degree of deformation.

It is possible to produce a differing bond between the part sections of the hollow shaft end and of the engagement length of the connecting section—in particular in the case of a flexible shaft section in the form of a flexi-shaft—as a result of the different degrees of deformation. It can also be ensured as a result that along with the positive locking engagement in, in particular, only one peripheral direction, axial securement against release out of the hollow shaft end during rotation is formed in the other peripheral direction.

In a preferred embodiment, the second part section with the second degree of deformation forms the free end of the rigid shaft.

The outer contour of the deformed connecting section is circular. The deformation of the hollow shaft end is carried out according to the principle of a diameter reduction without any change of shape. The deformed connecting section of the hollow shaft end comprises a smaller outer diameter than the rigid shaft section on the other side of the connecting section. The material of the connecting section, which is displaced radially inward on account of the smaller outer diameter, surrounds the engaging end section of the connecting section in a positive locking manner.

The material deformation is effected as a result of "rotary swaging" which is known per se as a deforming process. In the case of rotary swaging, the hollow shaft end and the press jaws which act on the periphery of the hollow shaft end rotate relative to one another. During the rotational movement, the press jaws change their radial distance to the hollow shaft end.

The connecting section is a flexible shaft section, in particular a flexi-shaft, in a preferred realization of the invention.

The flexible shaft section outside the hollow shaft end has a free length which corresponds to approximately between 5% and 100%, in particular between 10% and 20% of the length of the rigid shaft section. In an embodiment as a telescopic drive shaft, the rigid shaft section corresponds to the inner tube of the telescopic drive shaft.

In a preferred embodiment, the free length of the flexible shaft section is approximately between 200 mm and 400 mm. The engagement length of the flexible shaft section is advantageously at least twice, in a preferred manner at least three times the diameter of the rigid shaft section or of the inner tube of a telescopic drive shaft measured on the other side of the connecting section. In an advantageous manner, the end section of the connecting section projects into the hollow shaft end with an engagement length of at least one tenth of the free length of the flexible shaft section. The overall length of the rigid shaft section with connecting elements connected non-releasably thereto is advantageously between 0.8 and 2.5 m, in particular between 1.5 and 2 m. The maximum diameter of the rigid shaft section or of the inner tube of a telescopic drive shaft is advantageously smaller than 15 mm.

The flexible shaft section is realized at its end with multiple corners, in particular in the form of a polygonal cross section. The end of the connecting section which engages in the hollow shaft end comprises more corners than the end on the free length of the flexible shaft section.

In a preferred manner, the flexible shaft section is located on the end of the rigid shaft section which is located facing the rotational drive. In a preferred manner, the drive shaft itself is a telescopic drive shaft.

BRIEF DESCRIPTION OF THE DRAWINGS

The invention will now be described with reference to the drawings wherein:

FIG. 15 shows a schematic side view of the inner tube of a telescopic drive shaft;

FIG. 16 shows a telescopic drive shaft with the inner tube inserted;

FIG. 17 shows a section along the line A-A in FIG. 15;

DESCRIPTION OF THE PREFERRED EMBODIMENTS OF THE INVENTION

Figure 1:
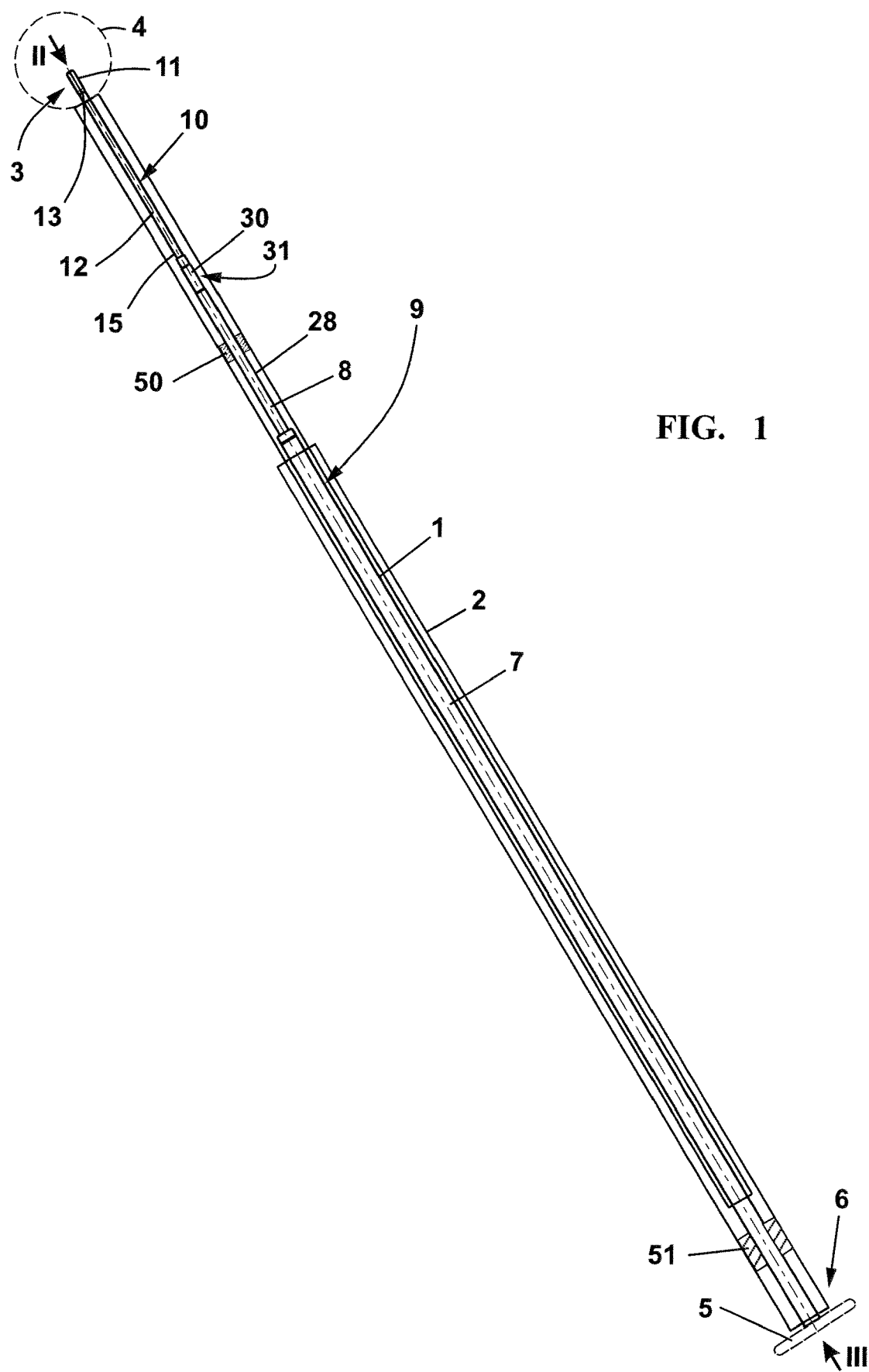
FIG. 1 shows a schematic of a telescopic drive shaft in a telescopic protective tube.

FIG. 1 shows a schematic of a drive shaft 1 in a protective tube 2. Such a drive shaft 1, which is preferably guided in a protective tube 2, is part of a handheld work apparatus, for example, a pruner, a hedge cutter, a brushcutter or similar work apparatus. A rotational drive 4 is connected on one end 3 of the drive shaft 1, as is shown schematically in FIG. 1. The rotational drive 4 can be a two-stroke engine in the form of a two-stroke engine with mixed lubrication, a four-stroke engine, an electric motor or similar rotational drive.

The torque generated by the rotational drive 4 is transmitted via the drive shaft 1 to a tool 5 which is connected to the other end 6 of the drive shaft 1. The tool 5 can be driven indirectly or directly by the drive shaft 1; the arrangement of a gear unit or an angle drive between the end 6 of the drive shaft and the tool 5 is practical. In particular, further drive elements, for example drive pinions or eccentrics, can be arranged between the other end 6 of the drive shaft 1 and the tool 5.

The drive shaft 1—telescopic in the embodiment—is produced, in particular, from hollow tubes. An outer tube 7 and an inner tube 8 together form a telescopic hollow shaft 9 as drive shaft 1.

Corresponding to the telescopic drive shaft 1, the protective tube 2 of the drive shaft 1 is also telescopic. The drive shaft 1 is mounted in the protective tube 2 by means of bearings 50, 51. The outer tube 7 is mounted in the outer protective tube 2 with at least one bearing 51; the inner tube 8 of the drive shaft 1 is mounted in the inner protective tube 2 with at least one bearing 50.

Figure 2:
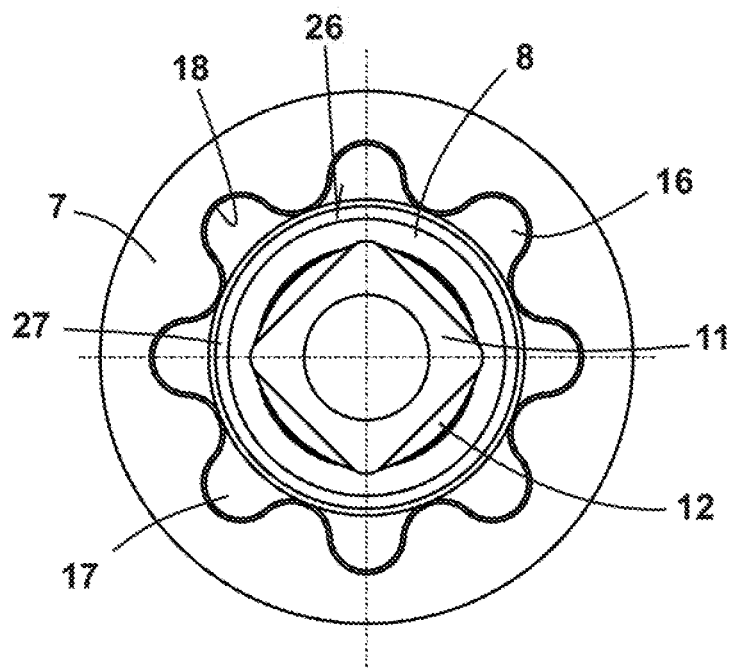
FIG. 2 shows an end view of the drive shaft in arrow direction II in FIG. 1 without a tool and without the protective tube being shown.

FIG. 2 shows an end view of the drive shaft 1 in arrow direction II from FIG. 1. A square 11 is provided for the connection to the rotational drive 4. The square 11 is part of a connecting section 10 which is realized, in particular, as a flexible shaft section 12. The square 11 forms a first end 13 of the connecting section 10 which is realized as flexible shaft section 12. The connecting section 10, which is realized as flexible shaft section 12, is held with its second end 15 plugged into the inner tube 8. The rigid shaft section 28 or the inner tube 8 is compressed uniformly over its periphery in a joining section 30 in the region of a hollow shaft end 31 (FIG. 11) and is deformed in such a manner that an end section 32 of the connecting section 10 is connected in a torque-transmitting and, in particular, in an axially captive manner to the rigid shaft section 28 or to the inner tube 8.

The rigid shaft section 28 or the inner tube 8 is realized on the other end as a hollow shaft end 21 and, in a captive manner, supports an entrainer 16 which comprises an axial profile 17. The axial profile 17 interacts with corresponding axial grooving 18 of the outer tube 7.

Figure 3:
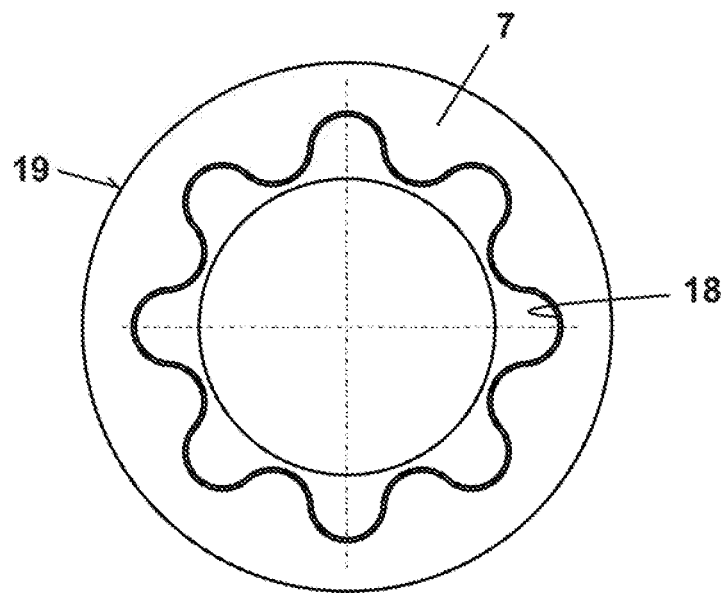
FIG. 3 shows an end view of the drive shaft in arrow direction III in FIG. 2 without any tool and without the protective tube being shown.

The profile of the outer tube 7 of the hollow shaft 9 is reproduced in FIG. 3. The outer tube 7 has internal axial grooving 18 and an external smooth outer periphery 19.

The outer tube 7 is mounted in the bearing 51 of the protective tube 2 at its outer periphery 19; correspondingly, the inner tube 8, which projects out of the outer tube 7, is rotatably mounted in the bearing 50 of the protective tube 2.

Figure 4:
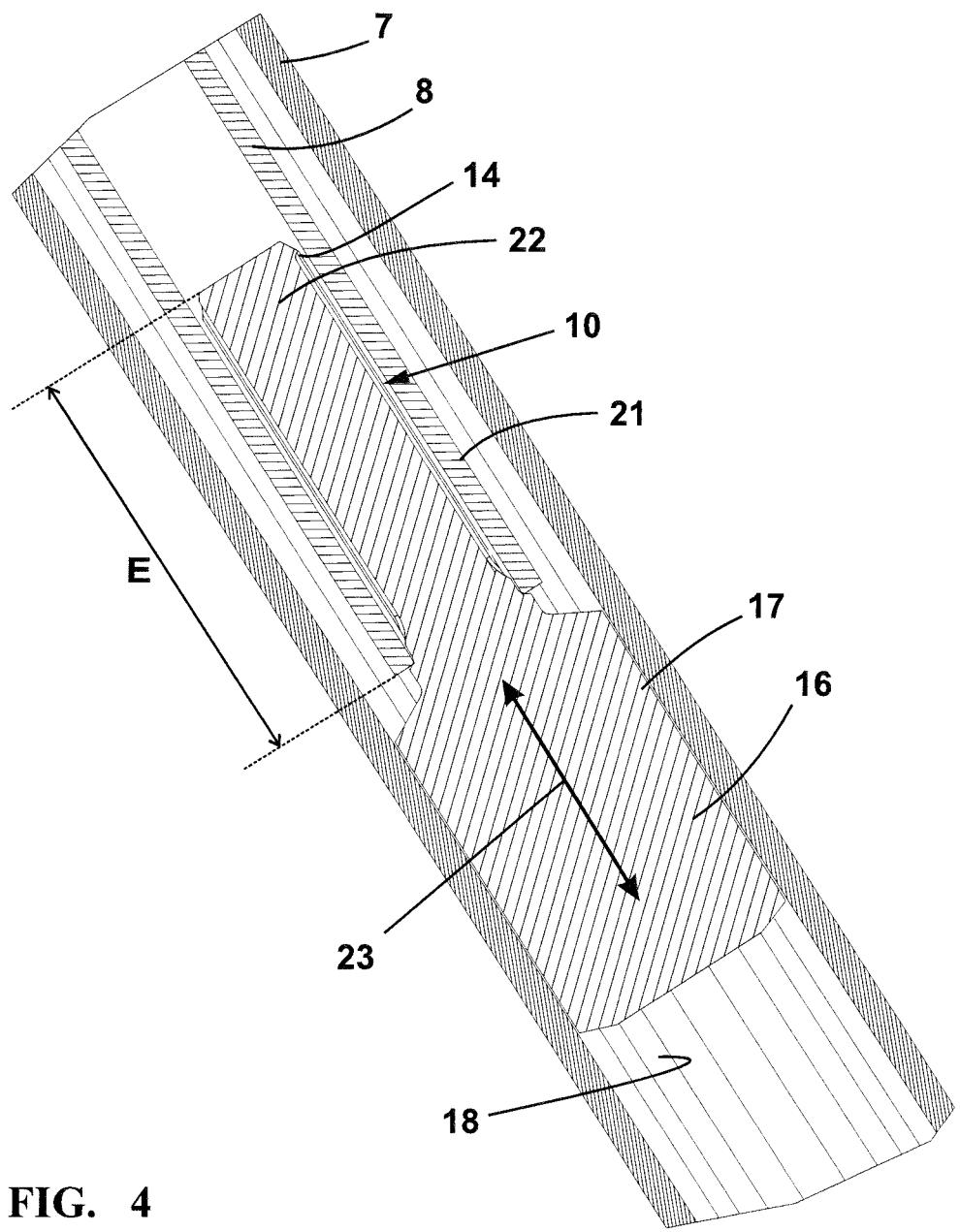
FIG. 4 shows a section through the hollow outer tube of the telescopic drive shaft according to FIG. 1 in the region of an entrainer which is rotationally connected to the inner tube.

As reproduced in the section view in FIG. 4, the entrainer 16 slides with its axial profile 17 in the inner axial grooving 18 of the outer tube 7. The inner tube 8 of the hollow shaft 9 is fastened at the hollow shaft end 21 facing the entrainer 16 at a connecting section 10 of the entrainer 16. The connecting section 10 of the entrainer 16 is formed by a profile extension 22 which is inserted into the hollow shaft end 21.

The entrainer 16 is axially displaceable along the outer tube 7 in arrow direction 23. A torque-transmitting connection between the inner tube 8 and the outer tube 7 of the drive shaft 1 is ensured in each axial position of the entrainer 16 in the outer tube 7.

Figure 5:
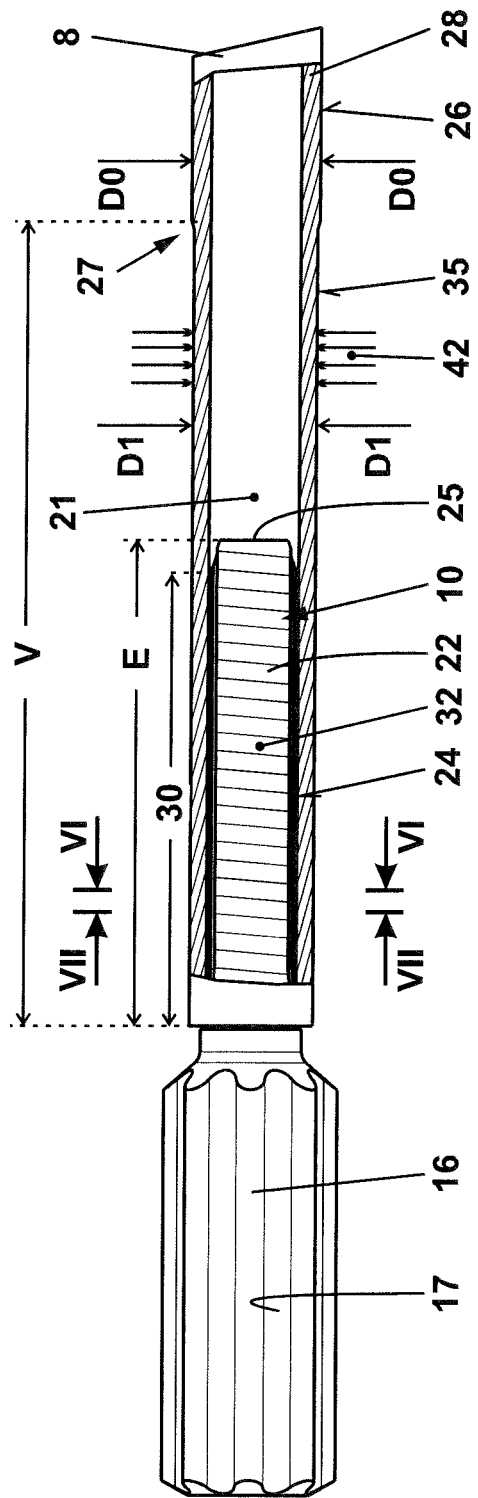
FIG. 5 shows an enlarged representation and a schematic representation of a part section of the entrainer which is fixed on the inner tube.
Figure 6:
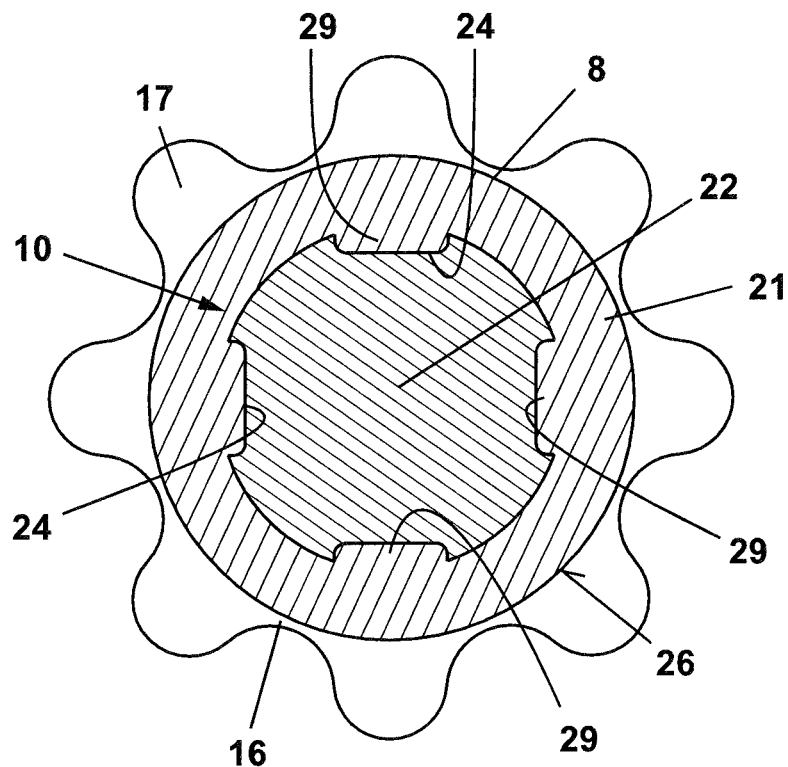
FIG. 6 shows a section along the line VI-VI in FIG. 5.
Figure 7:
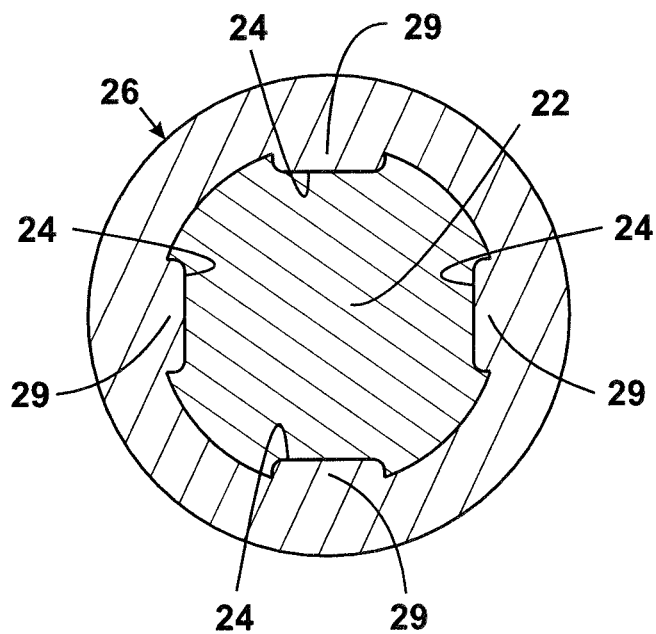
FIG. 7 shows a section along the line VII-VII in FIG. 5.

The fixing of the entrainer 16 in the hollow shaft end 21 of the inner tube 8 is reproduced in FIGS. 5 to 7.

The profile extension 22 of the entrainer 16 comprises at least one axially extending pocket-shaped depression 24. The depression 24 is shorter than the profile extension 22 and is at a distance to the end 25 of the profile extension 22. The depression is closed in the end region 14 in particular at the end 25 of the profile extension 22. Multiple depressions 24 can be arranged over the periphery of the profile extension 22. The depressions 24 are distributed in particular uniformly over the periphery of the profile extension 22.

The profile extension 22 engages with an engagement length E (FIG. 4) in the hollow shaft end 21 of the rigid shaft section 28 or of the inner tube 8. The inner tube 8 and the outer tube 7 consist of an aluminum alloy. The connecting section 10 which engages in the rigid shaft section 28 or the inner tube 8 preferably consists of a steel or spring steel. A connecting section 10 is realized from a harder material than the rigid shaft section 28 or the inner tube 8, preferably also the outer tube 7.

The hollow shaft end 21 of the rigid shaft section 28 and the profile extension 22 as engaging end section 32 of the connecting section 10 overlap one another. A joining section 30 is realized in the overlapping section. In order to obtain an internal, non-rotatable connection between the rigid shaft section 28 and the connecting section 10 of the entrainer 16 inside the joining section 30, the material of the hollow shaft end 21 is compressed over its entire periphery and is deformed in such a manner that the material 29 of the hollow shaft end 21 of the inner tube 8 flows into the axially extending, groove-like depressions 24 of the profile extension 22 and is thus radially displaced. The material 29 of the hollow shaft end 21 of the inner tube 8, which is displaced in this manner, engages in a rotationally connecting manner in the depressions 24 of the profile extension 22 of the connecting section 10. The external periphery 26 of the hollow shaft end 21 remains circular during the deformation. In particular, the material 29 of the hollow shaft end 21 is deformed in total over more than 300°, in particular more than 330° of the periphery. In a preferred realization, the material 29 of the hollow shaft end 21 is deformed in a circular manner over a periphery of 360° in particular whilst reducing the outer diameter D0. The hollow shaft end 21 is shaped, preferably pressed, in particular swaged in a rotationally connecting manner onto the engaging end section 32 of the connecting section 10, which end section is realized as profile extension 22.

In particular, for connecting the hollow shaft end 21, 31 to the connecting section 10, the hollow shaft end 21 is deformed over an axial length V which is greater than the engagement length E of the connecting section 10. The hollow shaft end 21 is also deformed in sections in which there are no more connecting sections 10 in the interior.

As shown in FIG. 5, in the embodiment the shaft end 21 is reduced from an outer diameter D0 to a reduced outer diameter D1 as a result of the material deformation. The diameter reduction is within the range of between 0.2 mm and 3 mm. The diameter of the rigid shaft section 28 is reduced from the outer diameter D0 to a reduced outer diameter D1 in an annular shoulder 27. The diameter reduction is effected in particular in a constant manner.

The annular shoulder 27 is advantageously located between sections of constant diameter D0 and D1. There is a step in the form of an annular shoulder 27 over the entire periphery in the outer periphery 26 of the inner tube 8.

The other end of the inner tube 8 is also realized as a hollow shaft end 31 and serves for the reception of an end section 32 of a connecting section 10 which is realized as flexible shaft section 12. The connecting section 10 connects the rotational drive 4 to the hollow shaft end 31 of the inner tube 8 via an engaging end section 32.

Figure 8:
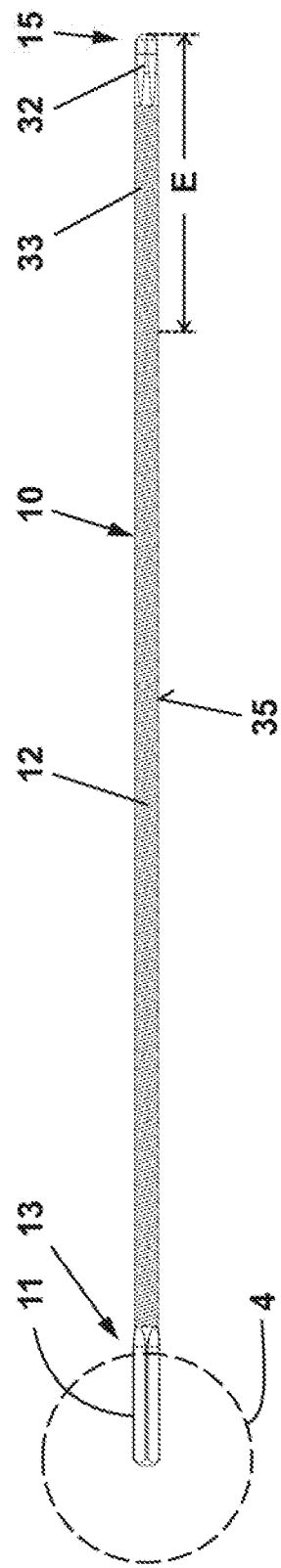
FIG. 8 shows a side view of a connecting section in the realization as a flexible shaft section.
Figure 9:
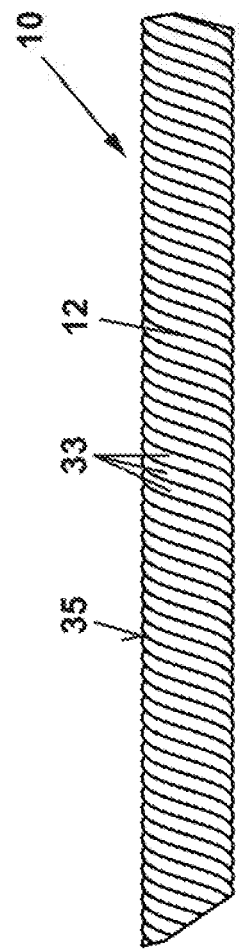
FIG. 9 shows an enlarged representation of a section length of the shaft section according to FIG. 8.

The flexible shaft section 12 is reproduced in FIGS. 8 and 9. As shown in FIG. 9, the flexible shaft section consists of a bond of multiple wire turns 33 which are located one on top of another, as a result of which a supple, highly flexible shaft is formed.

Figure 10:
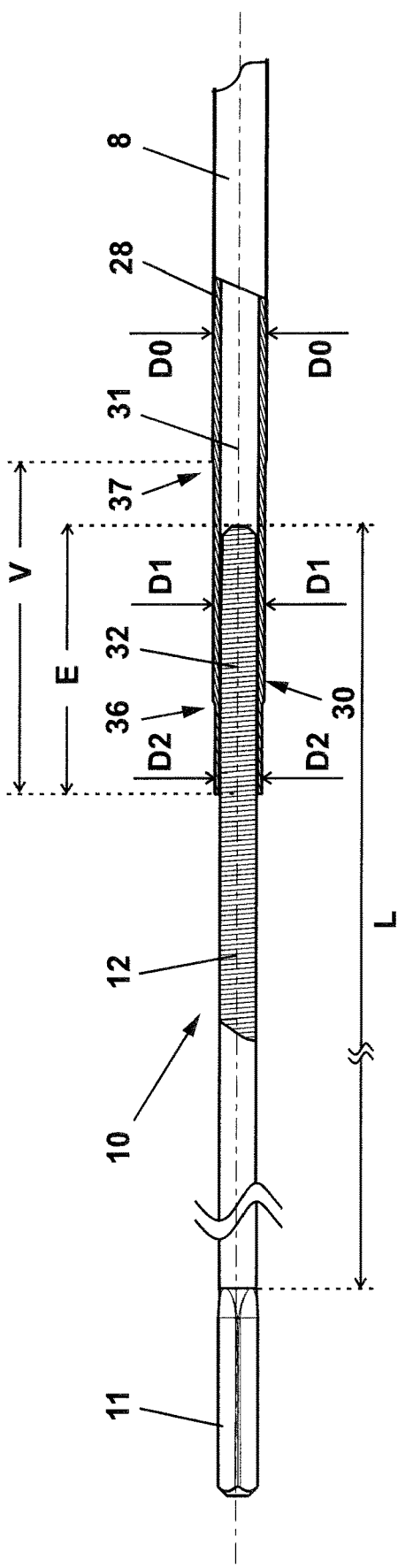
FIG. 10 shows a schematic sectional representation through the connecting section between the inner tube of the telescopic drive shaft and the flexible shaft section.
Figure 11:
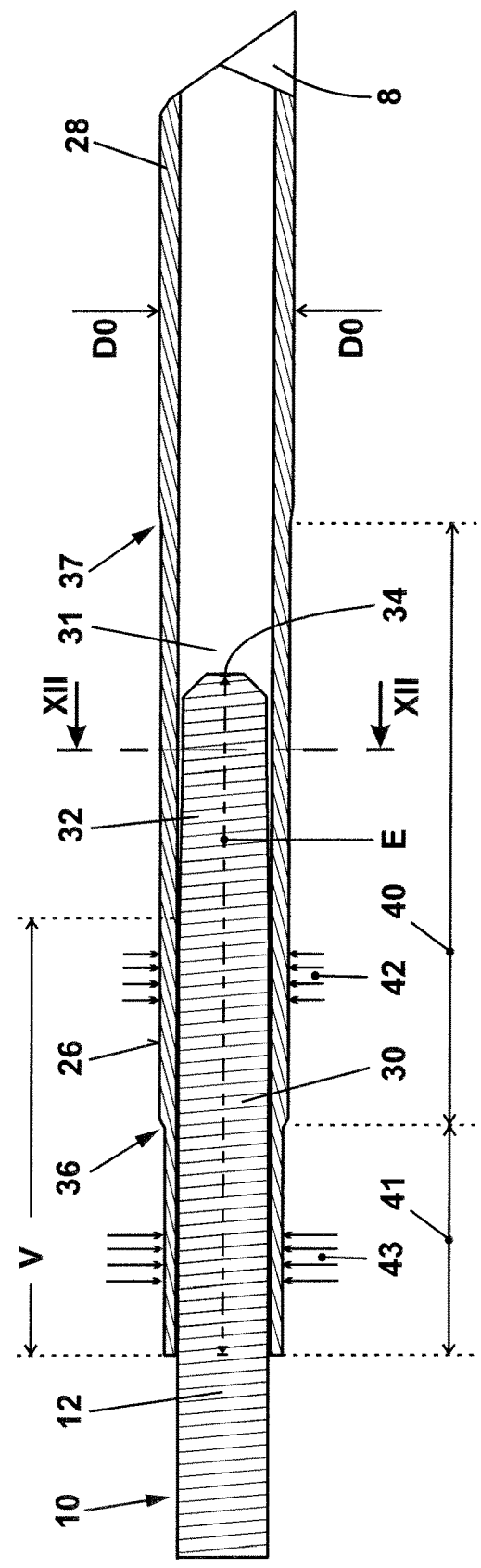
FIG. 11 shows an enlarged representation of the connecting section according to FIG. 10.

The end section 32—as shown in FIGS. 10 and 11—is inserted into the hollow shaft end 31 via an engagement length E. A joining section 30, which extends at least via part of the engagement length E, in particular at least 50% of the engagement length E, and is shown enlarged in FIG. 11, is realized in the overlapping region between the engagement length E of the end section 32 of the flexible shaft section 12 and the hollow shaft end 31.

The joining section 30 is the axial part of the overlapping section in which the outer periphery of the connecting section 10, for example, the flexi-shaft, and the inner contour 39 of the hollow shaft end 31 connect in a positive locking manner. In the joining section 30, the outer contour 35 (FIG. 9) of the end section 32 of the connecting section 10 is transmitted to the inner contour 39 of the hollow shaft end 31, such as, for example, shown in FIGS. 14 and 18. The entire inner contour 39 of the hollow shaft end 31 is deformed in the joining section 30 in such a manner that the hollow shaft end 31 abuts all around against the outer contour 35 of the end section 32. Abutting against the outer contour 35 is to be understood as when material 29 of the hollow shaft end 31 is displaced into a depression 24 of the end section 32. In this case, the depression 24 can also only be filled in part in the radial direction, that is, the bottom of the depression 24 cannot be reached.

If the hollow shaft end 31 abuts against the outer wire turns 33 of the flexible shaft section 12 and fills the depression 24 formed by a gap between the windings 33 at least in part, an abutment all around is formed in the terms of the invention.

The end 34 on the end section 32 of the flexible shaft section 12 is realized as multi-cornered, in particular as a polygonal cross section. The end 34, which is realized on the end section 32 of the connecting section 10 projecting into the hollow shaft end 31, comprises more corners than the other end 13 of the connecting section 10 located on the free length L. The end 13 of the connecting section 10 located on the free length L is formed, in particular, by a square 11. The outer circle of the end 34, which is realized on the end section 32 or the engagement length E of the connecting section 10, comprises a smaller diameter than an outer circle on the square 11 at the other free end 13 of the connecting section 10.

Once the polygonal end 34 on the end section 32 has been inserted into the hollow shaft end 31, the hollow shaft end 31 overlaps the engagement length E. The material of the hollow shaft end 31 is deformed over its outer periphery 26 in such a manner that the material 29 of the hollow shaft end 31 is radially displaced and shaped or pressed and/or swaged in a rotationally connecting manner onto the outer contour 35 of the engaging end section 32 of the connecting section 10, that is, of the flexible shaft 12.

To connect the hollow shaft end 31 to the connecting section 10, the hollow shaft end 31 is deformed over an axial length V which is greater than the engagement length E of the end section 32 of the flexible shaft section 12. The hollow shaft end 31 is also deformed in sections in which no more connecting sections 10 are situated in the interior.

The engaging end section 32 of the flexible shaft section 12 shows, as reproduced in FIG. 9, a thread-like outer contour 35 with helically circulating extending depressions 24. The material 29 of the hollow shaft end 31 is displaced into the depressions 24 in an engaging manner.

The hollow shaft end 31 is deformed over a first part section 40 with a first degree of deformation 42 and in a second part section 41 with a second degree of deformation 43. The degree of deformation 42, 43 inside a part section 40, 41 is advantageously constant. The degrees of deformation 42, 43 are reproduced in FIGS. 11 and 14 in the form of arrows. The first degree of deformation 42 is smaller than the second degree of deformation 43, which is shown by the length of the arrows. In a particularly advantageous manner, the second part section 41 forms the free end of the rigid shaft section 28 formed by the inner tube 8. The second part section 41 advantageously forms the free end of the joining section 30.

As shown in FIG. 11, in the first part section 40 the outer diameter D0 of the inner tube 8 or of the hollow shaft end 31 is reduced to a smaller diameter D1. In the second part section 41, the diameter D2 is reduced by a further amount to a smallest outer diameter. In this case, the outer contour of the joining section 30 remains circular, as the circular periphery 26 in the sectional representations in FIGS. 12 and 13 shows.

The end 34 of the end section 32 comprises a multi-cornered, in particular a polygonal cross section. Such a cross section is pressed as a result of deformation once the flexible shaft sections 12 have been cut to length and ensures that the cut-to-length end of the flexible shaft section does not split. In addition, a diameter reduction is achieved as a result of the deformation, which is why the cut-to-length end is simpler to thread into the hollow shaft end 31. The connecting section 10 of the flexible shaft 12 engaging in the hollow shaft end 31 over the engagement length E is realized in a polygonal manner. The cross section of the connecting section 10 is realized in a polygonal manner in particular only over part of the engagement length E. A further part of the engagement length E comprises advantageously a thread-like structure or outer contour 35.

In the embodiment shown according to FIGS. 10 and 11, the joining section 30 advantageously extends only over the thread-like part length of the engagement length E. The polygonal part of the end section 32 must not have non-rotatable contact with the hollow shaft end 31. It can be practical that the polygonal outer contour of the end 34 in the hollow shaft end 31 is also reduced at least in part, as shown for example in FIG. 12, as a result of further increasing the degree of deformation. Rotating the thread-like part length of the end section 32 out of the hollow shaft end 31 can be prevented.

Figure 12:
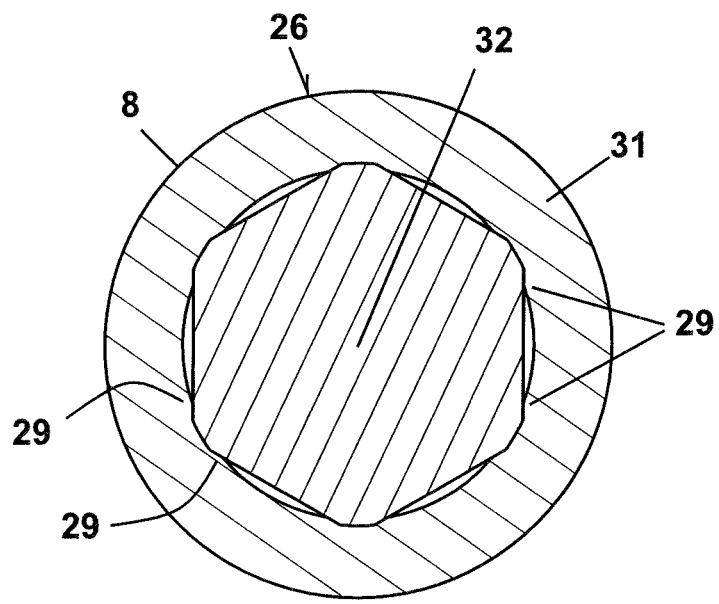
FIG. 12 shows a section along the line XII-XII in FIG. 11 of an alternative realization of the deformation of the hollow shaft end at the polygonal end of the connecting element.
Figure 13:
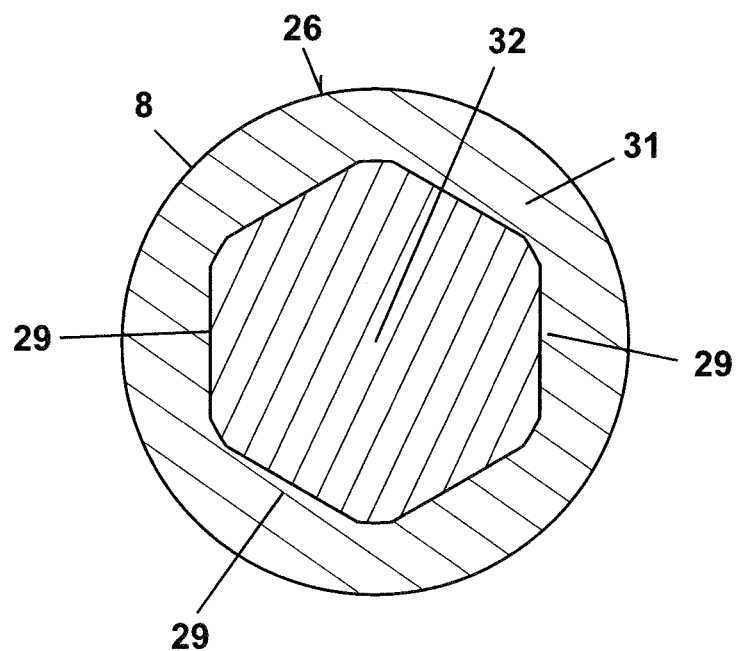
FIG. 13 shows a schematic representation according to FIG. 12 of a shaft end which is completely shaped onto a polygonal cross section of a connecting section.

The degree of deformation 42 is chosen to be smaller in the cross section according to FIG. 12 than in the cross section according to FIG. 13. In the case of a smaller degree of deformation in the cross section according to FIG. 12, the material 29 of the hollow shaft end 31 is already displaced in such a manner in the direction of the end section 32 that a torque-transmitting connection is formed. The end section 32 is held non-rotatably in the hollow shaft end 31.

In the cross section according to FIG. 13, the material displacement 29 is marked in such a manner that the polygonal cross section of the end 34 of the flexible shaft section 12 is completely held in the displaced material 29 of the hollow shaft end.

In the deformation region of the part section 40 and in the part section 41, the material 29 of the free shaft end 31 is advantageously displaced in such a manner between the wire turns 33 of the flexible shaft section 12 that the wire turns 33 assume varying distances relative to one another. As a result, the thread-like outer contour 35 of the flexible shaft section 12, which is preferably realized as a flexi-shaft, is changed locally. Rotating out of the shaft end 31 is prevented by material 29 pressed-in between the wire turns 33 as a result of the locally changed outer contour 35.

Figure 14:
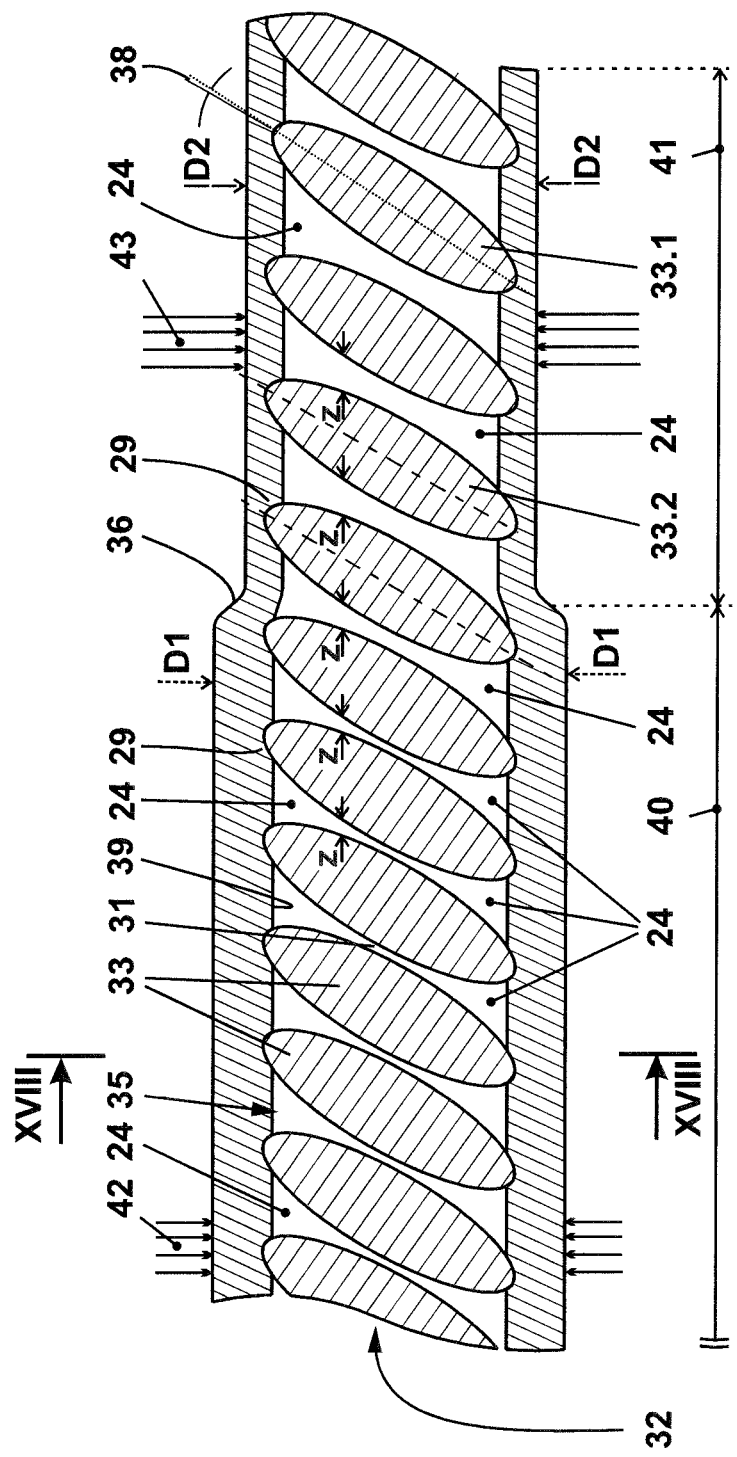
FIG. 14 shows an enlarged schematic representation of a longitudinal section through the joining section of a connecting section, which is realized as a flexible shaft, in a hollow shaft end.

Along with an increase in the distance z, the material 29 pressed-in between the wire turns 33 can also result in the position of a wire turn 33.1 (FIG. 14) changing relative to the position of other wire turns 33.2. In FIG. 14, the wire turn 33.1 lies flatter by an angle 38 than the wire turn 33.2 such that a different winding gradient is produced in the outer contour 35. The end section 32 of the flexible shaft section 12 rotating out of the hollow shaft end 31 of the inner tube 8 is also countered as a result of the local change in the outer contour 35.

The at least one connecting section 10 is connected non-releasably to the rigid shaft section 28. In particular, hollow shaft ends 21, 31, in each of which a connecting section 10 is held non-releasably, are realized at both ends of the rigid shaft section 28. With the reduction of its cross section, the rigid shaft section 28 is shaped onto the outer contour 35 of both plugged-in connecting sections with the inner contour 39 of its hollow shaft ends 21, 31. The cross section is deformed over the entire periphery in the radial direction in relation to an initial cross section on the other side of the joining section 30. The deformation is advantageously uniform over the entire periphery such that the form of the cross section corresponds advantageously to the form of the initial cross section.

Figure 19:
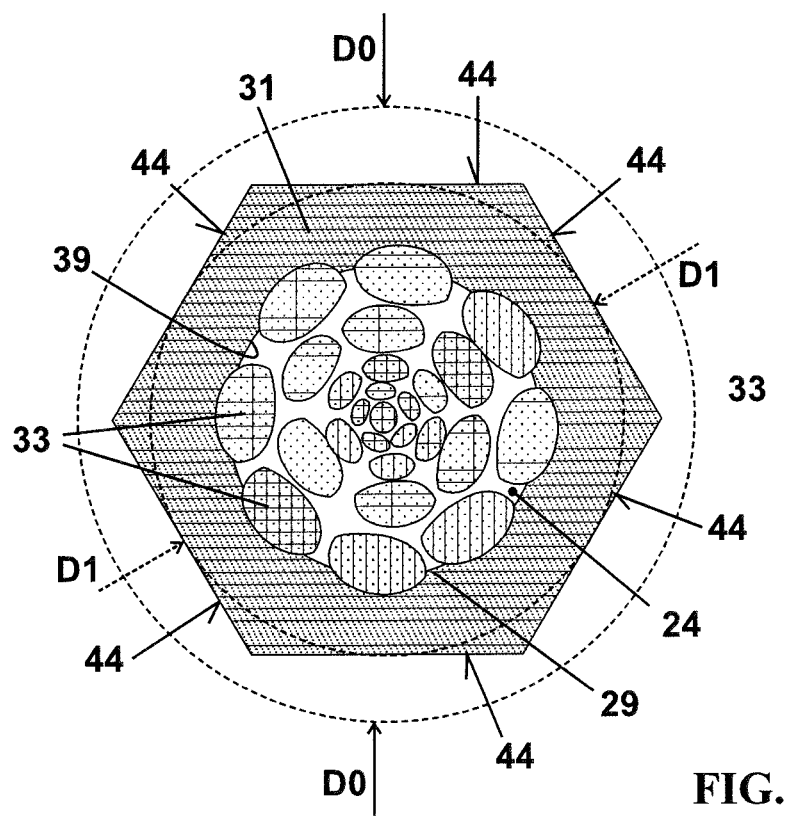
FIG. 19 shows a section corresponding to FIG. 18 with an outer contour of the hollow shaft end, which deviates from the circular form, in the region of the connecting section.

It can be practical for the hollow shaft end 31 to comprise a shape that deviates from the form of a cylinder in the joining section 30, with lateral surfaces 44 arranged regularly with respect to one another on the periphery, as shown in FIG. 19. The lateral surfaces 44 are arranged tangentially and at an identical distance to the outer periphery D0 of the connecting section 10.

As shown in FIG. 14, in the case of a—smaller—degree of deformation 42 in the first part section 40 of the joining section 30, the change in the position or the distance of the wire turns 33 in relation to one another is changed less severely than in the part section 41 with a stronger or larger degree of deformation 43.

Figure 18:
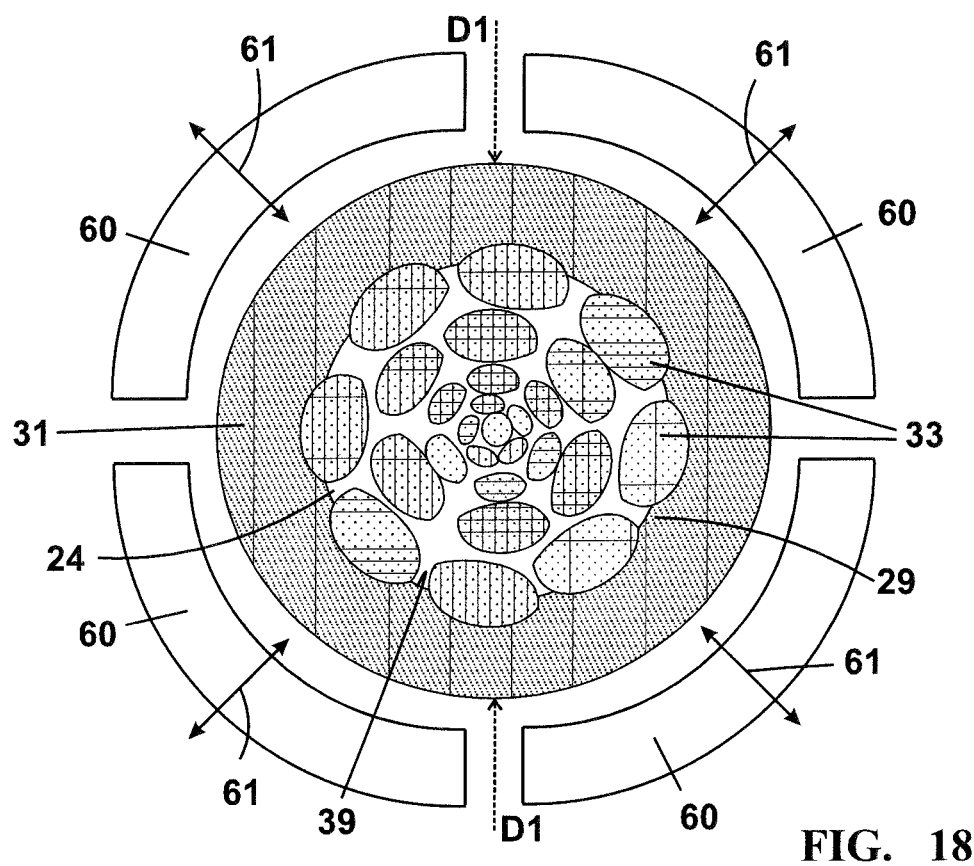
FIG. 18 shows a section along the line XVIII-XVIII in FIG. 14.

The expedient technique according to the invention for compressing the material 29 of the hollow shaft end 21, 31 is called "rotary swaging". In this case, the hollow shaft end 21, 31 is compressed by press jaws 60 (FIG. 18) which act on the entire periphery of the hollow shaft end 21, 31. In the case of rotary swaging, the deforming tools (press jaws 60) are arranged concentrically about the workpiece—the hollow shaft end 21, 31. Advantageously, the tools perform high frequency radial movements with short strokes in the arrow direction 61 (FIG. 18). The stroke frequency is expediently between 1500 and 10000 $min^{-1}$, total strokes between 0.2 mm and 5 mm being realized. Tool engagement of the press jaws 60 is advantageously effected at the same time.

In order to prevent the material flowing into the gap between the press jaws 60, the relative rotational movement is provided between the press jaws 60 and the workpiece—the hollow shaft end 21, 31. This can be achieved as a result of the tools (press jaws 60) revolving about the workpiece or the workpiece rotating between the tools (press jaws 60).

Rotary swaging is an incremental process where the deformation of the material is performed in many small individual steps. Homogenous material deformation is ensured by the incremental deformation.

FIG. 15 shows the inner tube 8 of the drive shaft 1 with a flexible shaft section 12 located facing the rotational drive 4. The free length L of the flexible shaft section 12 is approximately between 5% and 100%, in particular between 10% and 20% of the length F of the inner tube 8. In a preferred embodiment, the free length L is approximately between 200 and 400 mm in length. The engagement length E of the flexible shaft section 12 is advantageously at least twice, in a preferred manner at least three times, the diameter D0 of the rigid shaft section 28 or of the inner tube 8 on the other side of the joining section 30. In an advantageous manner, the end section 32 of the connecting section 10 projects with an engagement length E of at least a tenth of the free length L into the hollow shaft end 31. The overall length G, which is composed of the length of the inner tube 8 and of connection elements connected non-releasably thereon, is advantageously between 0.8 m and 2.5 m, in particular between 1.5 m and 2.0 m. The maximum diameter D0 of the inner tube is advantageously smaller than 15 mm and larger than 6 mm. The connecting joining 30 advantageously has a length V, which is contiguous in the axial direction, of more than a third of the engagement length E. The axial length V is in particular more than 15 mm.

As FIG. 16 indicates, in the embodiment, the inner tube 8 is held in the outer tube 7 so as to be longitudinally displaceable. A telescopic drive shaft 1, which provides an extension length T which enables an elongation of the inner tube 8 according to FIG. 15 by between 50% and 80%, preferably 70%, is obtained as a result.

FIG. 17 shows a view in the direction of the section A-A in FIG. 15. The free shaft end 31, which is reduced to the smallest outer diameter D2, is shown schematically—in an exaggerated manner. The part section 41 with the smallest diameter D2 merges via a first annular shoulder 36 into the further part section 40 with the larger diameter D1. The part section 40 in the non-deformed outer diameter D0 of the hollow shaft end 31 merges via a further annular shoulder 37.

The configuration according to the invention of the inner tube 8 also applies to non-telescopic drive shafts 1. The configuration of a non-telescopic drive shaft 1 corresponds to that of the inner tube 8 and of the connection elements held in particular captively thereon.

It is understood that the foregoing description is that of the preferred embodiments of the invention and that various changes and modifications may be made thereto without departing from the spirit and scope of the invention as defined in the appended claims.

What is claimed is:

1. A drive shaft in a protective tube of a portable handheld work apparatus wherein a rotational drive is connected to a first end of the drive shaft and a work tool is connected to a second end of the drive shaft so as to be driven thereby, the drive shaft comprising:
    at least one rigid shaft segment and at least one connecting section for transmitting torque;
    said rigid shaft segment being configured to have at least one hollow shaft end portion;
    said connecting section defining an engagement length (E) engaging into said hollow shaft end portion over a length thereof so as to cause said engagement length (E) and said length of said hollow shaft end portion to mutually overlap to conjointly define a joining section;
    said joining section being configured by said hollow shaft end portion being deformed;
    said hollow shaft end portion being made of a material which is compressed over the entire periphery thereof so as to cause said material to be radially displaced and pressed onto said engagement length (E) to form a rotative connection between said hollow shaft end portion and said engagement length (E); and,
    said material of said hollow shaft end portion being circularly deformed over a periphery of 360° thereof while reducing the outer diameter (D0) thereof.

2. The drive shaft of claim 1, wherein said hollow shaft end portion is deformed over an axial length (V) thereof which is greater than said engagement length (E) of said connecting section.

3. The drive shaft of claim 1, wherein at least said engagement length (E) of said connecting section has a peripheral surface with depressions formed therein; and, said material of said hollow shaft end portion is displaced into said depressions so as to engage therein.

4. The drive shaft of claim 1, wherein the deformation of said material is performed with rotary swaging with press jaws acting on the periphery of said hollow shaft end portion while said press jaws and said hollow shaft end portion rotate relative to each other.

5. The drive shaft of claim 1, wherein said connecting section is a flexible shaft section.

6. The drive shaft of claim 5, wherein said flexible shaft section is a flex shaft.

7. The drive shaft of claim 5, wherein said rigid shaft segment has an overall length (G); said flexible shaft section has a free length (L) outside of said hollow shaft end portion; and, said free length (L) lies in a range of 5% to 100% of said overall length (G).

8. The drive shaft of claim 5, wherein said flexible shaft section is arranged at the end of said rigid shaft segment directed toward said rotational drive.

9. The drive shaft of claim 1, wherein said drive shaft is a telescopic drive shaft.

10. A drive shaft in a protective tube of a portable handheld work apparatus wherein a rotational drive is connected to a first end of the drive shaft and a work tool is connected to a second end of the drive shaft so as to be driven thereby, the drive shaft comprising:
- at least one rigid shaft segment and at least one connecting section for transmitting torque;
- said rigid shaft segment being configured to have at least one hollow shaft end portion;
- said connecting section defining an engagement length (E) engaging into said hollow shaft end portion over a length thereof so as to cause said engagement length (E) and said length of said hollow shaft end portion to mutually overlap to conjointly define a joining section;
- said joining section being configured by said hollow shaft end portion being deformed;
- said hollow shaft end portion being made of a material which is compressed over the entire periphery thereof so as to cause said material to be radially displaced and pressed onto said engagement length (E) to form a rotative connection between said hollow shaft end portion and said engagement length (E);
- said joining section having first and second subsections defining first and second degrees of deformation, respectively; and,
- said first and second degrees of deformation being of respectively different magnitudes.

11. The drive shaft of claim 10, wherein said first degree of deformation is less than said second degree of deformation.

12. The drive shaft of claim 10, wherein said hollow shaft end portion has a free end and said second subsection has said second degree of deformation defining said free end.

13. The drive shaft of claim 10, wherein the deformed joining section has an outer contour which is circularly round and has an outer diameter (D1, D2) smaller than the outer diameter of said rigid shaft segment beyond said joining section.

14. A drive shaft in a protective tube of a portable handheld work apparatus wherein a rotational drive is connected to a first end of the drive shaft and a work tool is connected to a second end of the drive shaft so as to be driven thereby, the drive shaft comprising:
- at least one rigid shaft segment and at least one connecting section for transmitting torque;
- said rigid shaft segment being configured to have at least one hollow shaft end portion;
- said connecting section defining an engagement length (E) engaging into said hollow shaft end portion over a length thereof so as to cause said engagement length (E) and said length of said hollow shaft end portion to mutually overlap to conjointly define a joining section;
- said joining section being configured by said hollow shaft end portion being deformed;
- said hollow shaft end portion being made of a material which is compressed over the entire periphery thereof so as to cause said material to be radially displaced and pressed onto said engagement length (E) to form a rotative connection between said hollow shaft end portion and said engagement length (E);
- said connecting section being a flexible shaft section having a free length (L);
- said flexible shaft section having respective ends and a polygonal cross section at said ends; and,
- the end of said connecting section, which projects into said hollow shaft end portion, having more corners than the end on the free length (L) of said flexible shaft section.

* * * * *